(12) United States Patent
Ishizu

(10) Patent No.: US 11,190,812 B2
(45) Date of Patent: Nov. 30, 2021

(54) COMMUNICATION APPARATUS, CONTROL METHOD FOR CONTROLLING THE SAME, AND RECORDING MEDIUM FOR THE SAME

(71) Applicant: CANON KABUSHIKI KAISHA, Tokyo (JP)

(72) Inventor: Akihiko Ishizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/709,713

(22) Filed: Dec. 10, 2019

(65) Prior Publication Data

US 2020/0213630 A1 Jul. 2, 2020

(30) Foreign Application Priority Data

Dec. 26, 2018 (JP) .............................. JP2018-242855

(51) Int. Cl.
*H04N 21/2187* (2011.01)
*H04L 29/08* (2006.01)
(Continued)

(52) U.S. Cl.
CPC ......... *H04N 21/2187* (2013.01); *H04L 67/02* (2013.01); *H04L 67/10* (2013.01);
(Continued)

(58) Field of Classification Search
CPC ......... H04N 21/2187; H04N 21/23439; H04N 21/25875; H04N 21/4233; H04N 21/4312; H04N 21/43637; H04N 21/44029; H04N 21/643; H04N 21/4431; H04N 21/8586; H04N 1/00244; H04L 67/02; H04L 67/10;
(Continued)

(56) References Cited

U.S. PATENT DOCUMENTS

| | | |
|---|---|---|
| 8,832,287 B2 | 9/2014 | Yang et al. |
| 2002/0038359 A1* | 3/2002 | Ihara .................. H04N 21/6175 709/219 |

(Continued)

FOREIGN PATENT DOCUMENTS

| | | |
|---|---|---|
| CN | 101155260 A | 4/2008 |
| JP | 2008-211732 A | 9/2008 |
| JP | 2010166128 A | 7/2010 |

*Primary Examiner* — John R Schnurr
(74) *Attorney, Agent, or Firm* — Canon U.S.A., Inc. IP Division

(57) ABSTRACT

A communication apparatus includes a communication unit; and a control unit. The control unit performs control to cause a relay apparatus via the communication unit to request, from an external apparatus, second data for transmitting first data to the external apparatus. The control unit performs control to cause the communication unit to receive the second data from the relay apparatus. The control unit performs control to cause the communication unit to transmit the first data to the external apparatus without going through the relay apparatus based on the second data. The first data is communicated in compliance with a first communication protocol, and the second data is communicated in compliance with a second communication protocol. A communication compliant with the first communication protocol is less delayed than a communication compliant with the second communication protocol.

24 Claims, 12 Drawing Sheets

(51) Int. Cl.
  *H04N 21/4223* (2011.01)
  *H04N 21/4402* (2011.01)
  *H04N 21/258* (2011.01)
  *H04N 21/431* (2011.01)
  *H04N 21/2343* (2011.01)
  *H04N 21/643* (2011.01)
  *H04N 21/4363* (2011.01)

(52) U.S. Cl.
  CPC . *H04N 21/23439* (2013.01); *H04N 21/25875* (2013.01); *H04N 21/4223* (2013.01); *H04N 21/4312* (2013.01); *H04N 21/43637* (2013.01); *H04N 21/44029* (2013.01); *H04N 21/643* (2013.01)

(58) Field of Classification Search
  CPC ..... H04L 65/60; H04L 65/1069; H04L 65/80; H04L 65/602; H04L 65/4076
  See application file for complete search history.

(56) References Cited

U.S. PATENT DOCUMENTS

| | | | |
|---|---|---|---|
| 2002/0156648 A1* | 10/2002 | Yoshimine | H04N 21/47214 709/228 |
| 2009/0185040 A1 | 7/2009 | Yang et al. | |
| 2012/0072961 A1* | 3/2012 | Marignan | H04N 21/632 725/109 |
| 2017/0251241 A1 | 8/2017 | Baratz | |
| 2018/0152491 A1* | 5/2018 | Hara | H04N 1/33346 |
| 2018/0191668 A1* | 7/2018 | Yu | H04W 4/025 |
| 2018/0270284 A1 | 9/2018 | Lee | |
| 2019/0020905 A1* | 1/2019 | Bennett | H04W 60/00 |
| 2019/0020914 A1* | 1/2019 | Zhang | H04L 65/1073 |
| 2019/0132613 A1* | 5/2019 | Jiao | H04L 65/4076 |
| 2019/0173935 A1* | 6/2019 | Lohmar | H04L 65/80 |
| 2019/0174202 A1* | 6/2019 | Shankar | H04N 21/4781 |
| 2019/0268389 A1* | 8/2019 | Govindarajan | H04L 63/0457 |
| 2020/0344498 A1* | 10/2020 | Lazar | H04N 21/44 |

* cited by examiner

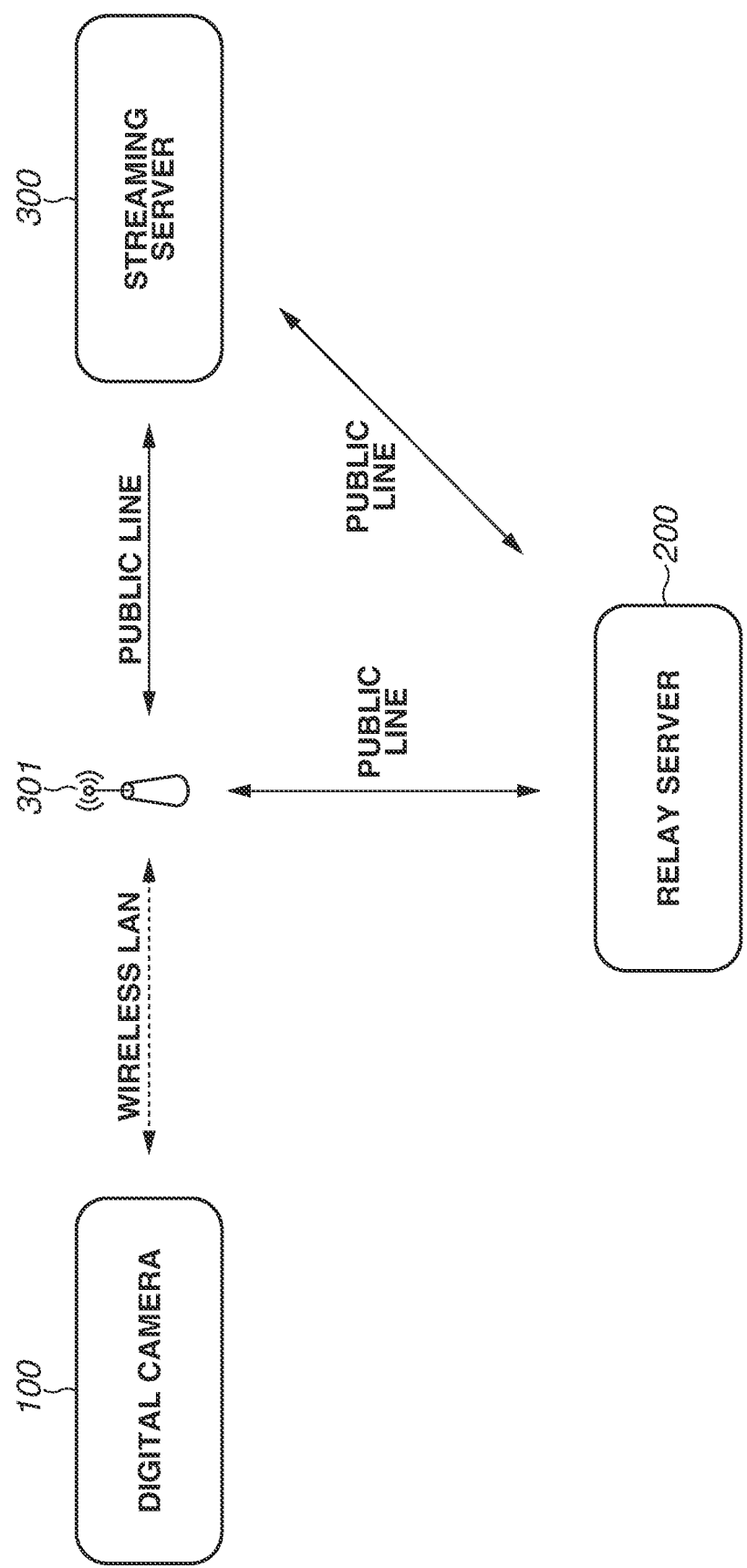

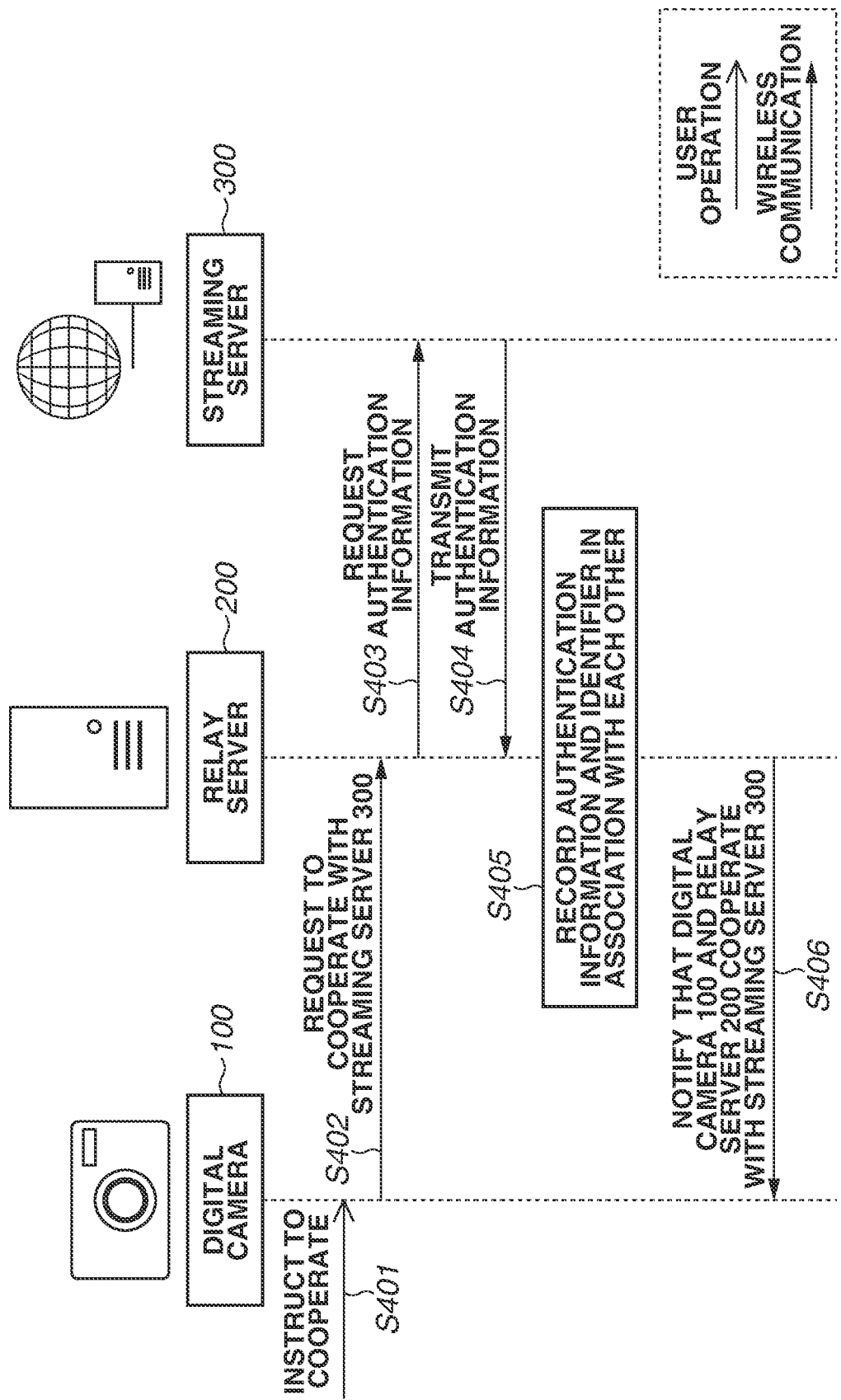

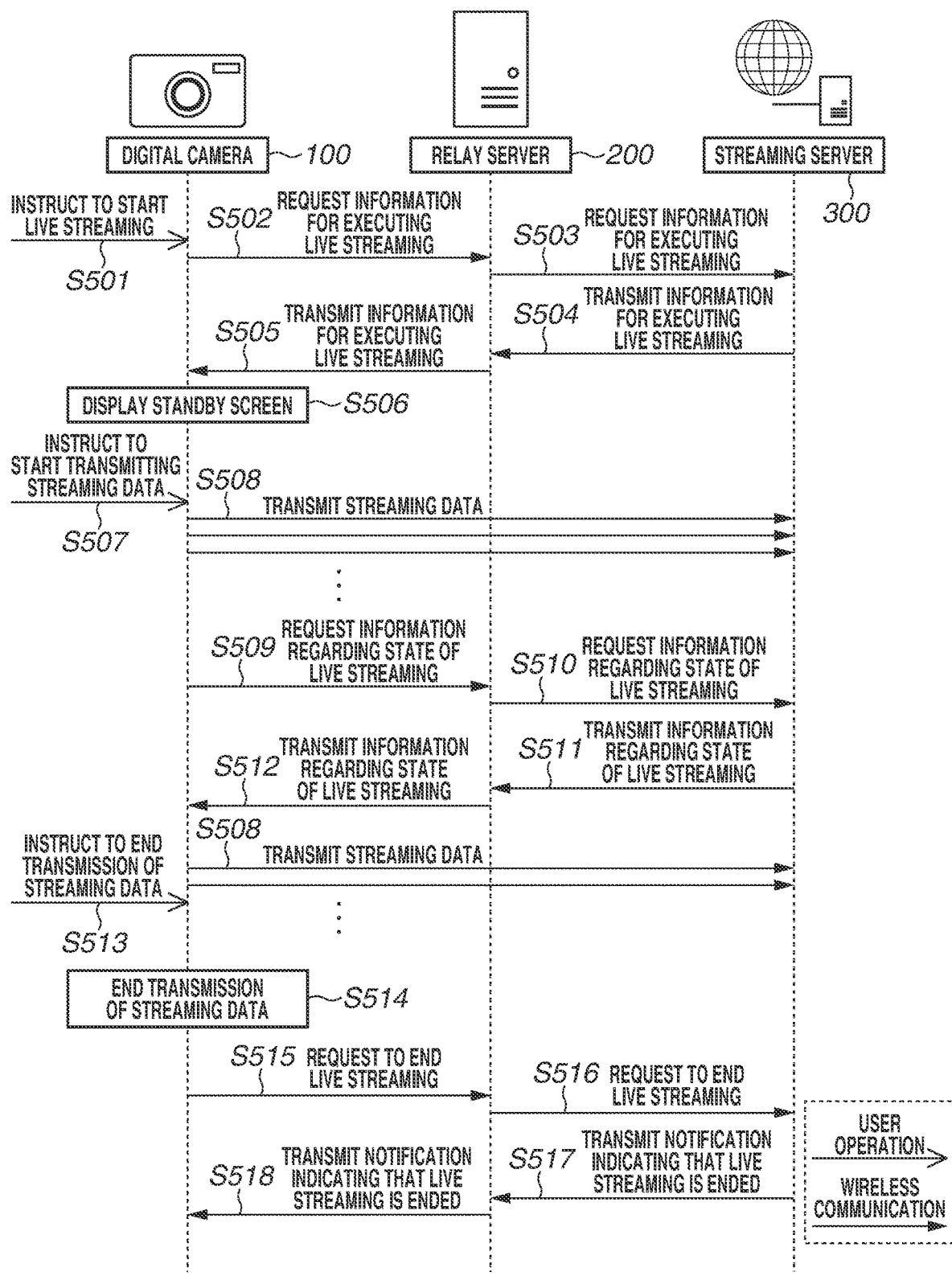

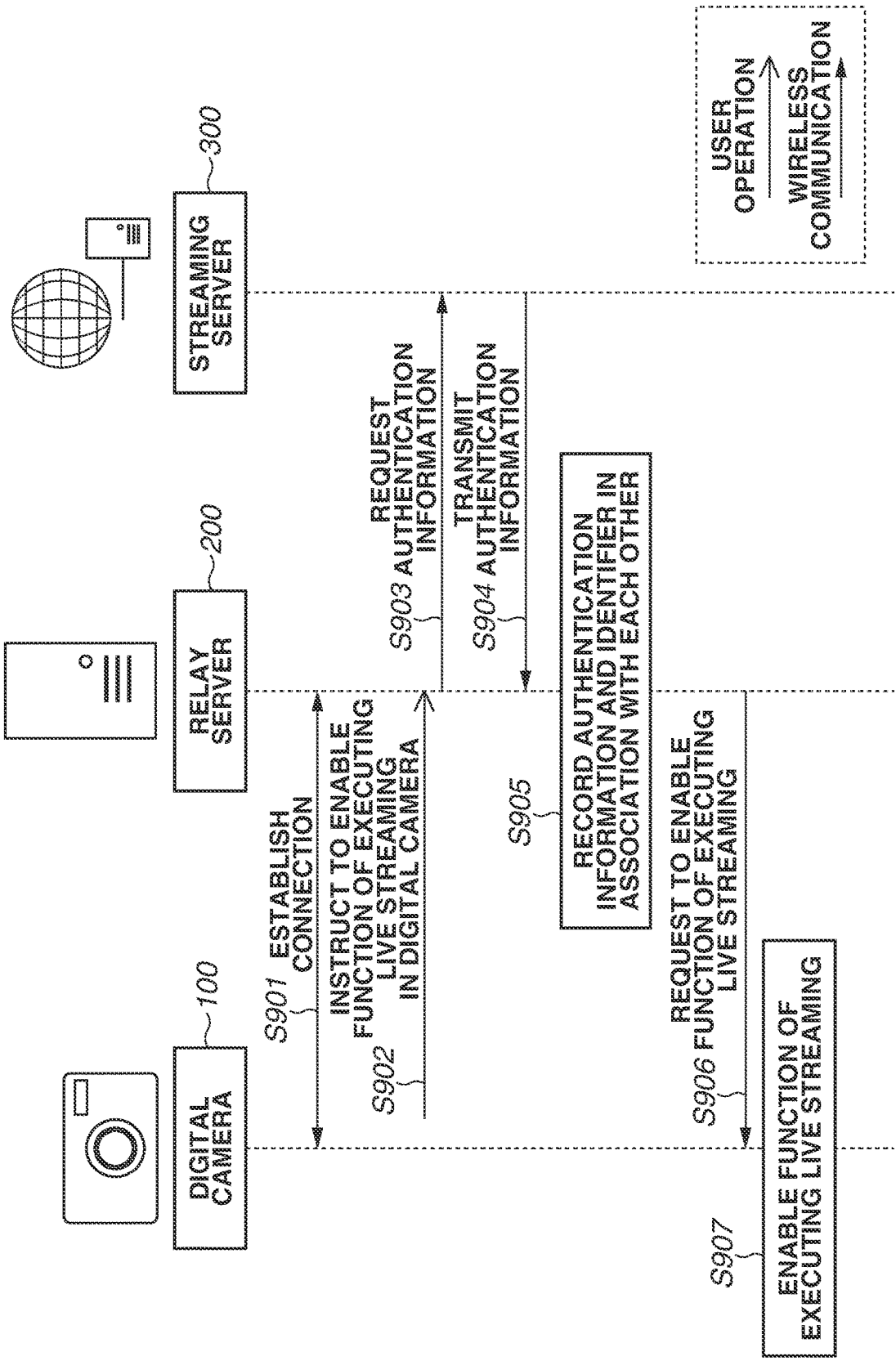

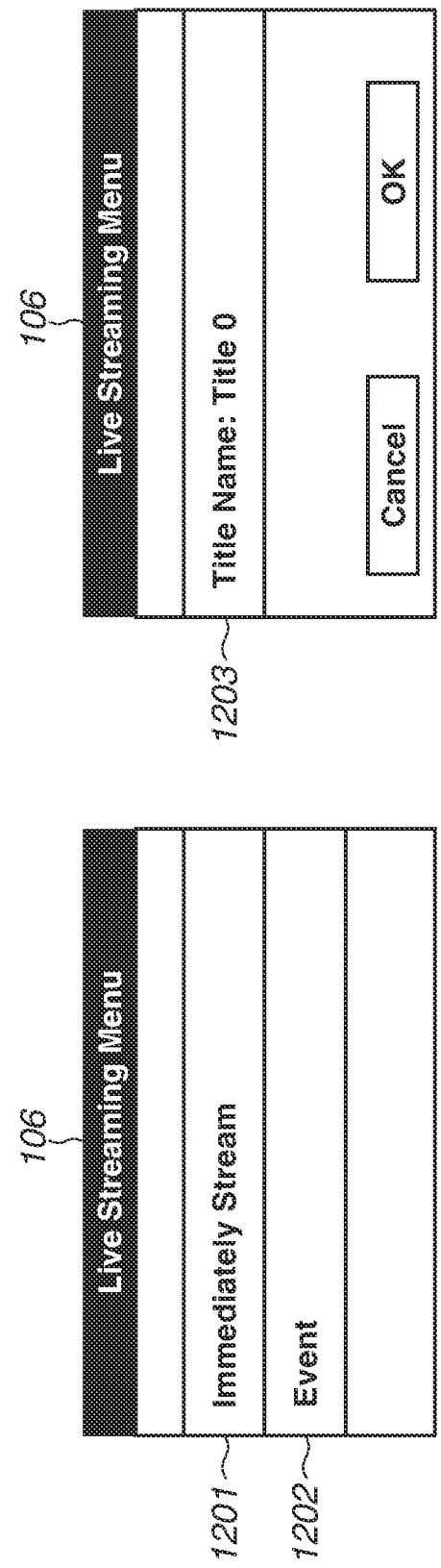
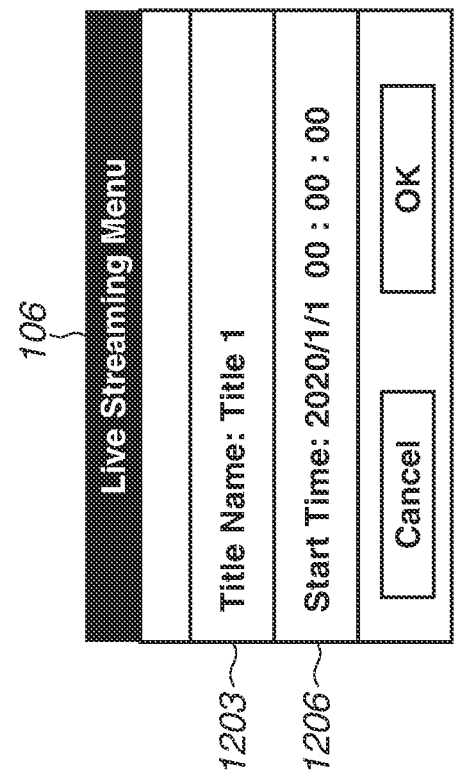
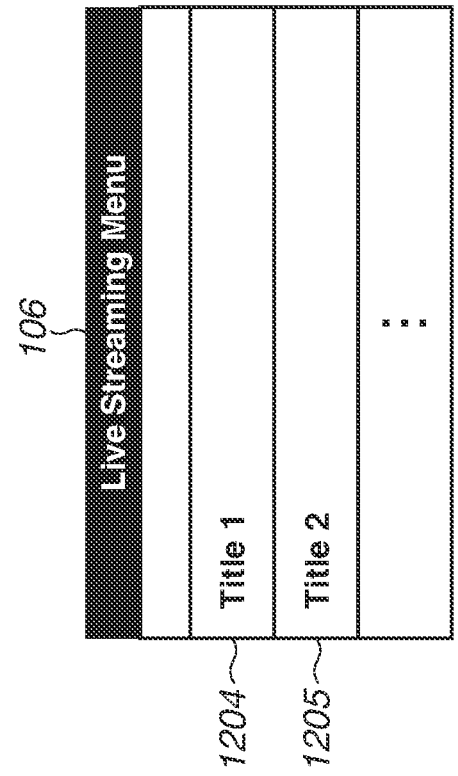

COMMUNICATION APPARATUS, CONTROL METHOD FOR CONTROLLING THE SAME, AND RECORDING MEDIUM FOR THE SAME

BACKGROUND

Field of the Disclosure

The present disclosure relates to a communication apparatus capable of communicating with another apparatus via a network, and a relay apparatus capable of communicating with another apparatus via the network.

Description of the Related Art

In recent years, a live stream service for streaming moving image data or sound data in real time has been available. A user can generate moving image data or sound data using a camera or a microphone provided in a communication apparatus, such as a smartphone and a digital camera, and transmit the generated data to another user in real time via the live streaming service.

In transmitting and receiving data to and from a cloud service, such as the live streaming service, the digital camera transmits the data using an interface, such as a web application programming interface (API). Generally, cloud services are each different in interface for transmitting data. Thus, the digital camera needs to be compliant with the interface of each cloud service. If the interface is updated, the user needs to update the digital camera so that the digital camera is compliant with the interface. The publication of Japanese Patent Application Laid-Open No. 2008-211732 discusses a system where a digital camera does not directly transmit data to a cloud service, but transmits the data to the cloud service via a relay server. In such a system, the digital camera needs to be compliant with only at least an interface of the relay server.

The digital camera transmits the data via the relay server in the publication of Japanese Patent Application Laid-Open No. 2008-211732, and thus, it takes extra time, the time taken for passing the relay server, for the data to be transmitted to the cloud service, however. For this reason, this system is unsuitable for a cloud service that requires real-time processing performance as in a live streaming service. On the other hand, even if the digital camera directly transmits the data to the cloud service, but if the interface of the cloud service is changed, a user may take time to update the digital camera every time the user uses the cloud service.

SUMMARY

According to some embodiments, a communication apparatus includes a communication unit, and a control unit. The control unit performs control to cause a relay apparatus via the communication unit to request, from an external apparatus, second data for transmitting first data to the external apparatus. The control unit performs control to cause the communication unit to receive the second data from the relay apparatus. The control unit performs control to cause the communication unit to transmit the first data to the external apparatus without going through the relay apparatus based on the second data. The first data is communicated in compliance with a first communication protocol, and the second data is communicated in compliance with a second communication protocol. A communication compliant with the first communication protocol is less delayed than a communication compliant with the second communication protocol.

Further features of various embodiments will become apparent from the following description of exemplary embodiments with reference to the attached drawings.

BRIEF DESCRIPTION OF THE DRAWINGS

FIG. 3 is a diagram illustrating an example of a configuration of a communication system according to the first exemplary embodiment.

FIG. 4 is a sequence diagram illustrating an example of a preparation process for executing live streaming according to the first exemplary embodiment.

FIG. 5 is a sequence diagram illustrating an example of processing of the digital camera, the relay server, and a streaming server when the live streaming according to the first exemplary embodiment is executed.

FIG. 9 is a sequence diagram illustrating an example of a preparation process for executing live streaming according to a second exemplary embodiment.

FIG. 12A illustrates an example of a screen for selecting a type of the live streaming with the digital camera according to the second exemplary embodiment. FIG. 12B illustrates an example of a confirmation screen before the live streaming with the digital camera according to the second exemplary embodiment is started. FIG. 12C illustrates an example of a screen for selecting an event of the live streaming with the digital camera according to the second exemplary embodiment. FIG. 12D illustrates an example of a confirmation screen before the live streaming of the digital camera according to the second exemplary embodiment is started.

DESCRIPTION OF THE EMBODIMENTS

With reference to the accompanying drawings, some exemplary embodiments will be described in detail below.

The exemplary embodiments described below are an examples, and may appropriately be modified or changed depending on the configuration of an apparatus to which the embodiments are applied and various conditions. Further, the exemplary embodiments can also be appropriately combined together.

<Configuration of Digital Camera 100>

Figure 1:
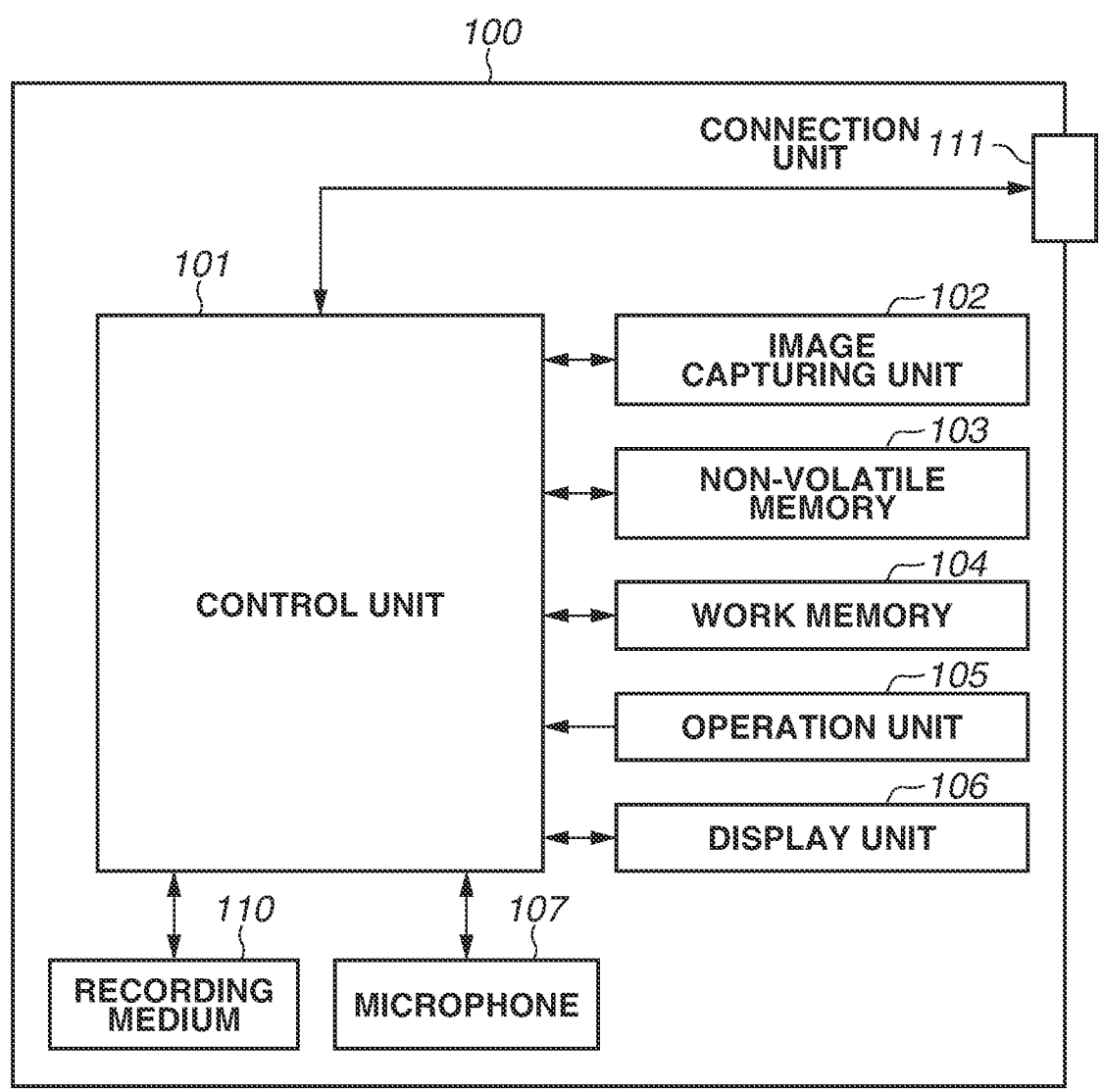
FIG. 1 is a diagram illustrating an example of a configuration of a digital camera according to a first exemplary embodiment.

A first exemplary embodiment will be described below. FIG. 1 is a block diagram illustrating a configuration example of a digital camera 100, which is an example of a communication apparatus according to the present exemplary embodiment. While a digital camera is described as an example of the communication apparatus, the communication apparatus is not limited to this. For example, the communication apparatus may be an information processing apparatus such as a smartphone, a tablet device, a digital video camera, or a personal computer. The present exemplary embodiment is described particularly using as an example the digital camera 100 that can be carried by a user.

A control unit 101 controls the components of the digital camera 100 based on an input signal and a program (described below). Instead of the control unit 101 controlling the entirety of the apparatus, a plurality of hardware devices may share processing, thus controlling the entirety of the apparatus.

An image capturing unit 102 includes, for example, an optical lens unit, an optical system for controlling the aperture, the zoom, and the focus, and an image sensor for converting light (optical image) introduced through the optical lens unit into an electrical video signal. As the image sensor, generally, a complementary metal-oxide-semiconductor (CMOS) sensor or a charge-coupled device (CCD) image sensor is used. The image capturing unit 102 is controlled by the control unit 101, thereby causing the image sensor to convert object light formed by a lens included in the image capturing unit 102 into an electric signal. The image capturing unit 102 then performs processes, such as a noise reduction process, on the electric signal and outputs digital data as image data. In the present exemplary embodiment, a series of processes for capturing and outputting the image data is referred to as "imaging". The image capturing unit 102 records continuously captured image data as a single piece of data and thereby can generate moving image data. In the digital camera 100 according to the present exemplary embodiment, the image data and the moving image data are recorded in a recording medium 110 in compliance with the Design Rule for Camera File system (DCF) standard. Image data and moving image data to be transmitted to a live streaming service are temporarily recorded in a work memory 104. These pieces of data are transmitted to a streaming server 300 via a connection unit 111.

A non-volatile memory 103 is an electrically erasable and recordable non-volatile memory and stores a program (described below) to be executed by the control unit 101.

The work memory 104 is used as a buffer memory for temporarily holding image data and moving image data captured by the image capturing unit 102, an image display memory for a display unit 106, and a work area for the control unit 101.

An operation unit 105 is used to receive an instruction given to the digital camera 100 by the user. The operation unit 105 includes, for example, a power button for the user to give an instruction to turn on or off the digital camera 100, a release switch for the user to give an instruction to perform imaging, and a reproduction button for the user to give an instruction to reproduce image data. The operation unit 105 further includes operation members, such as a dedicated connection button for starting communicating with an external device via the connection unit 111 (described below). The operation unit 105 also includes a touch panel formed on the display unit 106. The release switch includes switches SW1 and SW2 (not illustrated). When the release switch enters a half press state, the switch SW1 is turned on. Consequently, the operation unit 105 receives an instruction to make an imaging preparation, such as an autofocus (AF) process, an automatic exposure (AE) process, an automatic white balance (AWB) process, and a pre-flash (EF) process. When the release switch enters a full press state, the switch SW2 is turned on. Consequently, the operation unit 105 receives an instruction to perform imaging.

The display unit 106 displays a viewfinder image in imaging, imaged image data, and characters for an interactive operation. The display unit 106 does not necessarily need to be built into the digital camera 100. The digital camera 100 only needs to be able to connect to the display unit 106 inside or outside the digital camera 100 and have at least a display control function for controlling the display of the display unit 106. The control unit 101 sequentially transfers image data or moving image data accumulated in the work memory 104 to the display unit 106 and displays the image data or the moving image data on the display unit 106, whereby the display unit 106 functions as an electronic viewfinder. This enables the digital camera 100 to display a through-lens image (a live view).

A microphone 107 is an example of a sound collection unit. The microphone 107 is used to collect a sound. The digital camera 100 records moving image data imaged by the image capturing unit 102 and sound data collected by the microphone 107 in association with each other, thus recording moving image data with sound. A sound collected to be transmitted from the control unit 101 to the live streaming service (described below) is recorded as sound data in the work memory 104. The sound data is transmitted to the streaming server 300 via the connection unit 111.

The recording medium 110 can record image data and moving image data output from the image capturing unit 102. The recording medium 110 may be configured to be attachable to and detachable from the digital camera 100, or may be built into the digital camera 100. That is, the digital camera 100 needs only to have at least means for accessing the recording medium 110.

The connection unit 111 is an interface for connecting to an external apparatus. The digital camera 100 according to the present exemplary embodiment can exchange data with a relay server 200 and the streaming server 300 via the connection unit 111. For example, the digital camera 100 can transmit moving image data generated by the image capturing unit 102 and sound data generated by the microphone 107 to the streaming server 300 via the connection unit 111. In the present exemplary embodiment, the connection unit 111 includes an interface for communicating with a relay apparatus and the external apparatus via a wireless local area network (LAN) compliant with the Institute of Electrical and Electronics Engineers (IEEE) 802.11 standard. The connection unit 111 of the digital camera 100 according to the present exemplary embodiment has a client mode where the connection unit 111 operates as a client in an infrastructure mode. Then, the digital camera 100 according to the present exemplary embodiment causes the connection unit 111 to operate in the client mode, and thus the digital camera 100 is operable as a client apparatus in the infrastructure mode. If the digital camera 100 operates as the client apparatus, the digital camera 100 connects to an access point device near the digital camera 100, thus joining a LAN formed by the access point device. The control unit 101 controls the connection unit 111 thus implementing wireless communication with the relay apparatus and the external apparatus. The communication method is not limited to a wireless LAN, and includes a public wireless communication method, such as fourth generation 4G or Long-Term Evolution (LTE), and a wired communication method in compliance with a standard, such as Ethernet.

This is the description of the digital camera 100.

<Configuration of Relay Server 200>

Figure 2:
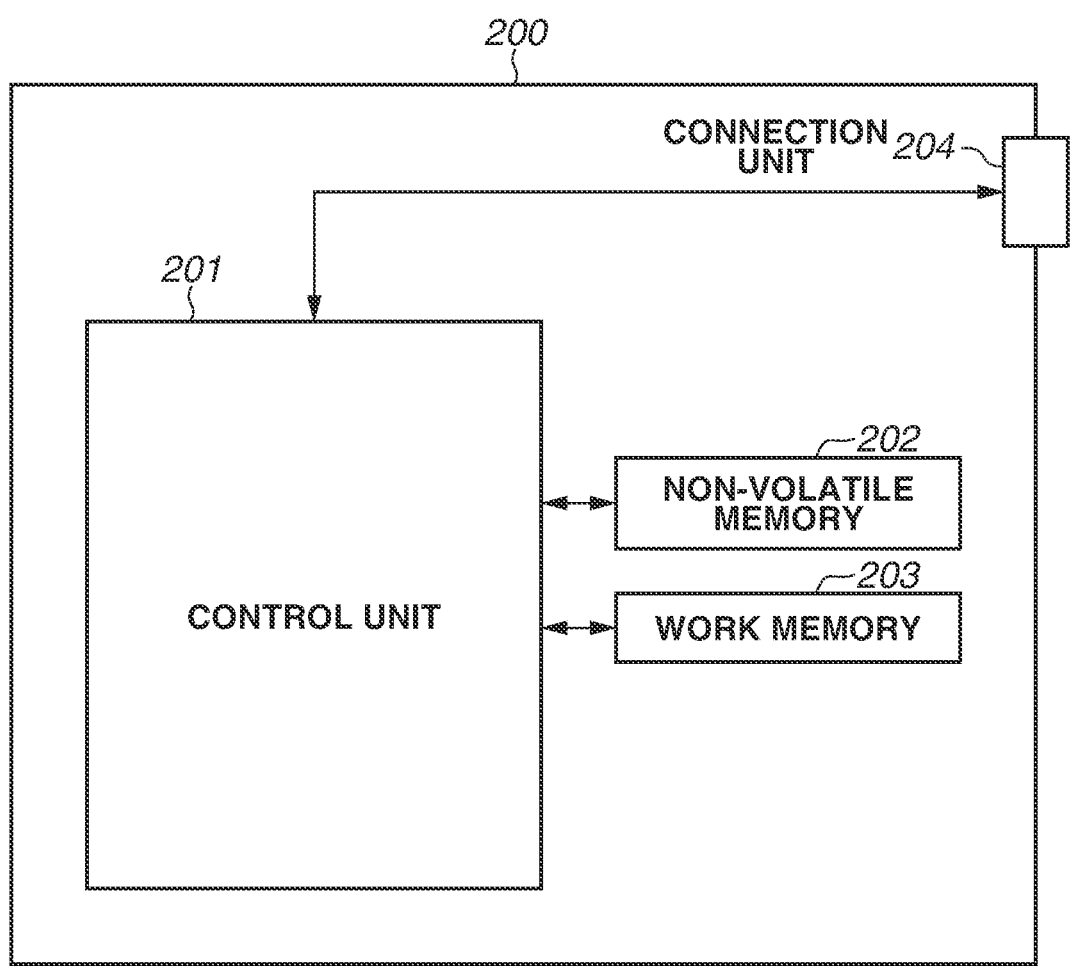
FIG. 2 is a diagram illustrating an example of a configuration of a relay server according to the first exemplary embodiment.

Next, the relay server 200, which is an example of the relay apparatus, will be described. FIG. 2 is a block diagram illustrating an example of the configuration of the relay server 200, which is an example of the relay apparatus according to the present exemplary embodiment. While a server is described as an example of the relay apparatus, the relay apparatus is not limited to this. The relay apparatus only needs to have a function capable of relaying communication between the digital camera 100 and the streaming server 300 and responding to a change in a web application programming interface (API) of the streaming server 300. The web API will be described below. The relay server 200 is an information processing apparatus, such as a smartphone, a tablet device, or a personal computer.

A control unit 201 controls the components of the relay server 200 according to an input signal and a program (described below). Instead of the control unit 201 controlling the entirety of the apparatus, a plurality of hardware devices may share processing to control the entirety of the apparatus.

A non-volatile memory 202 is an electrically erasable and recordable non-volatile memory. In the non-volatile memory 202, an operating system (OS), which is basic software to be executed by the control unit 201, and an application that cooperates with the OS to implement an applicative function are recorded. In the present exemplary embodiment, the non-volatile memory 202 stores an application for communicating with the digital camera 100 and the streaming server 300.

A work memory 203 is used as a work area for the control unit 201.

A connection unit 204 is an interface for connecting to the communication apparatus and the external apparatus. The relay server 200 according to the present exemplary embodiment can exchange data with the communication apparatus and the external apparatus via the connection unit 204.

<Description of Streaming Server 300>

The streaming server 300, which is an example of the external apparatus according to the present exemplary embodiment, provides a cloud service. In particular, the cloud service in this example is a cloud service expected by the user to provide a service with less delay. In the present exemplary embodiment, the streaming server 300 provides a live streaming service.

"Live streaming" refers to streaming of moving image data or sound data from a user to a viewer (another user) in real time via the Internet, using a streaming technique. The viewer can view the moving image data or hear the sound data in real time, as in live television broadcasting or live radio broadcasting. In the present exemplary embodiment, the digital camera 100 is an example of a communication apparatus capable of performing live streaming. In the present exemplary embodiment, the digital camera 100 transmits moving image data that is being imaged by the digital camera 100 to the streaming server 300, and the streaming server 300 provides a service so that the received moving image data can be viewed on a web page. Hereinafter, moving image data and sound data generated by the digital camera 100 and to be streamed in live streaming will be collectively referred to as "streaming data".

Before starting live streaming, the user creates an event on the streaming server 300 using a personal computer or a smartphone. The event is data including information about settings regarding the live streaming, such as the identifier of the live streaming, a destination Uniform Resource Locator (URL) for the live streaming, a stream key, the title of the live streaming, and the bit rate of moving image data. The destination URL for the live streaming is, for example, a URL to which streaming data generated by the digital camera 100 is transmitted. The stream key is information used by the streaming server 300 to associate the user with the streaming data. The user can create a plurality of events in the streaming server 300. The digital camera 100 can also create an event. In the present exemplary embodiment, the streaming server 300 transmits an event to the relay server 200. Based on the event, the relay server 200 transmits, to the digital camera 100, information necessary for the digital camera 100 in the live streaming.

A communication protocol which is used to transmit and receive data for a preparation process for the live streaming and a communication protocol which is used to transmit and receive the streaming data in the live streaming are different. The former is a communication protocol that enables data communication. As the former, a widely available communication protocol is assumed to be used. The latter is a communication protocol for the purpose of communication with less delay. For example, the former is Hypertext Transfer Protocol (HTTP), and the latter is Real-Time Messaging Protocol (RTMP). Communication compliant with the latter protocol (RTMP) is characterized by less delay communication compliant with the former communication protocol (HTTP).

In the communication compliant with HTTP, the communication apparatus performs communication based on an interface termed a web API. The web API is a communication API, and generally, a different web API is defined for each cloud service. In the present exemplary embodiment, the digital camera 100 performs communication in accordance with a web API defined by the relay server 200, and the relay server 200 performs communication in accordance with a web API defined by the streaming server 300. Generally, a web API is often modified, in contrast to a communication protocol.

<System Configuration>

FIG. 3 is a diagram illustrating a system configuration example in which the digital camera 100 accesses the relay server 200 and the streaming server 300 and executes live streaming via a network. In this case, the digital camera 100 records the address of the relay server 200, and the relay server 200 records the address of the streaming server 300. These addresses are, for example, Internet Protocol (IP) addresses.

The digital camera 100 and the relay server 200 connect to each other via a network router 301. The network router 301 as an access point of a wireless LAN forms a network. The digital camera 100 joins as a client the network formed by the network router 301. In the present exemplary embodiment, an example is described where the digital camera 100 wirelessly connects to the network router 301. Alternatively, the digital camera 100 may connect to the network router 301 in a wired manner. The digital camera 100 connects to the relay server 200 via the network router 301. The relay server 200 connects to the streaming server 300 via a public line. The digital camera 100 then receives the address of the streaming server 300 from the relay server 200 and connects to the streaming server 300 using the received address.

In this communication system according to the present exemplary embodiment, the digital camera 100 is described as a single digital camera. Alternatively, a plurality of digital cameras 100 can also connect to the relay server 200 and the streaming server 300.

<Preparation Process for Executing Live Streaming>

First, a description will be provided of a preparation process for executing live streaming. The preparation process is a process for causing the digital camera 100, the relay server 200, and the streaming server 300 to cooperate with each other. Here, assume that the digital camera 100 and the relay server 200 have been connected. In the preparation process, the digital camera 100 and the relay server 200 communicate with the streaming server 300 in compliance with HTTP.

FIG. 4 is a sequence diagram illustrating an example of a preparation process for executing live streaming according to the present exemplary embodiment.

In S401, the digital camera 100 receives from the user an instruction to cause the relay server 200 and the streaming server 300 to cooperate with each other. Here, the user inputs registration information for accessing the streaming server 300 to the digital camera 100. The registration information is used for verifying that the user is registered in the streaming server 300. For example, the registration information is an account identification (ID) and a password for accessing the streaming server 300.

In S402, the digital camera 100 requests the relay server 200 to cooperate with the streaming server 300. Here, the digital camera 100 transmits the registration information and the identifier of the digital camera 100 to the relay server 200. The identifier can be of any type as long as the digital camera 100 can be identified. The identifier is, for example, an ID including eight-digit alphanumeric characters. In the present exemplary embodiment, the identifier is generated by the digital camera 100.

In S403, the relay server 200 requests authentication information from the streaming server 300. In the present exemplary embodiment, the relay server 200 requests the authentication information from the streaming server 300 using the registration information received in S402. The authentication information is, for example, an access token. At this time, the relay server 200 requests the authentication information from the streaming server 300 using a web API defined by the streaming server 300.

In S404, the relay server 200 receives the authentication information from the streaming server 300. The relay server 200 can access the streaming server 300 using the authentication information.

In S405, the relay server 200 records the authentication information received in S404 and the identifier of the digital camera 100 received in S402 in association with each other. This enables the user to cause the digital camera 100 and the relay server 200 to cooperate with the streaming server 300.

In S406, as a response to the request received in S402, the relay server 200 transmits to the digital camera 100 a notification indicating that the digital camera 100 and the relay server 200 cooperate with the streaming server 300.

In this way, the digital camera 100 communicates with the streaming server 300 via the relay server 200 in communication compliant with HTTP. Thus, even if the web API of the streaming server 300 is changed, the relay server 200 responds to the change, thereby eliminating the need for the digital camera 100 to respond to the change. There are two advantages of causing not the digital camera 100 but the relay server 200 to respond to the change in the web API. One of the advantages is that, generally, it is easier to change a program in an information processing apparatus (in particular, a stationary apparatus), such as a server than in a communication apparatus (in particular, a portable apparatus), such as the digital camera 100. The other is that if a plurality of digital cameras 100 exists in the communication system according to the present exemplary embodiment, it is easier to cause the relay server 200 alone to respond to the change in the web API than cause all the digital cameras 100 to respond to the change in the web API.

In the present exemplary embodiment, the user transmits the registration information to the relay server 200 via the digital camera 100. Alternatively, other methods may be used. For example, the user may transmit the registration information to the relay server 200 from an information processing apparatus, such as another personal computer.

In S402, the digital camera 100 generates the identifier with which the digital camera 100 can be identified. Alternatively, the identifier may be generated by the relay server 200. In this case, in S402, the relay server 200 generates the identifier with which the digital camera 100 can be identified in response to the received request. The relay server 200 then transmits the generated identifier to the digital camera 100. As described above, either of the digital camera 100 and the relay server 200 can generate the identifier with which the digital camera 100 can be identified.

Figure 6A:
FIG. 6A illustrates an example of a screen for starting the live streaming process according to the first exemplary embodiment.
Figure 6B:
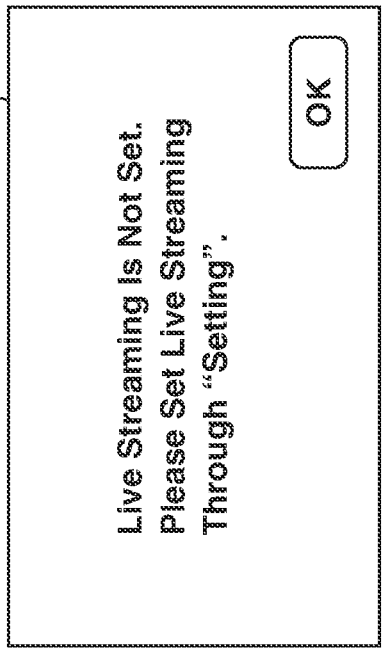
FIG. 6B illustrates an example of a standby screen before the live streaming with the digital camera according to the first exemplary embodiment is started.
Figure 6C:
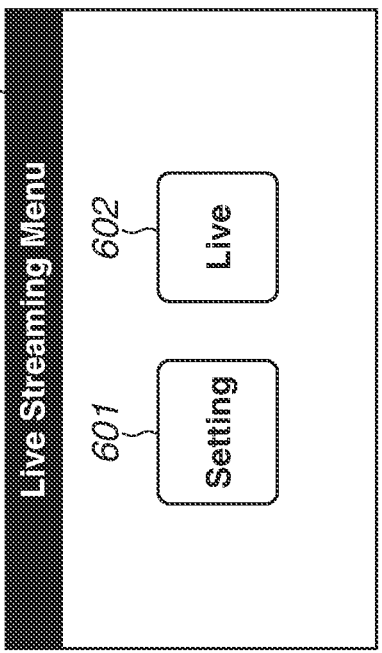
FIG. 6C illustrates an example of a screen during the live streaming with the digital camera according to the first exemplary embodiment.

FIG. 5 is a diagram illustrating a sequence example of the processing of the digital camera 100, the relay server 200, and the streaming server 300 when the live streaming according to the present exemplary embodiment is executed. FIGS. 6A, 6B and 6C illustrate display screen examples of the digital camera 100 according to the present exemplary embodiment. With reference to FIGS. 5 and 6A, 6B, and 6C, a series of operations in the live streaming will be described.

In S501, the user inputs an instruction to start the live streaming by operating the digital camera 100. FIG. 6A is an example of a screen for starting the live streaming process according to the present exemplary embodiment. For example, the user selects a button 602 by performing a touch operation on the touch panel to start the live streaming process. If the user selects a button 601 by performing a touch operation on the touch panel, the digital camera 100 starts the preparation process for performing the live streaming described with reference to FIG. 4.

In S502, the digital camera 100 requests information for executing the live streaming from the relay server 200. The information for executing the live streaming is, for example, the destination URL for the live streaming and a stream key. The information for executing the live streaming may be an event. At this time, the digital camera 100 also transmits the identifier of the digital camera 100. The digital camera 100 communicates with the relay server 200 using a web API defined by the relay server 200.

In S503, the relay server 200 requests the information for executing the live streaming with the digital camera 100 from the streaming server 300. To request the information from the streaming server 300, the relay server 200 uses the authentication information recorded in association with the identifier received in S502. The relay server 200 communicates with the streaming server 300 using a web API defined by the streaming server 300.

In S504, as a response to the request, the streaming server 300 transmits the information for executing the live streaming to the relay server 200. At this time, the streaming server 300 transmits, for example, a default event as the information for executing the live streaming. In this operation, the streaming server 300 enters the state where the streaming server 300 can receive streaming data.

In S505, the relay server 200 transmits the information received in S504 to the digital camera 100.

In S506, before transmitting the streaming data to the streaming server 300, the digital camera 100 displays a standby screen. FIG. 6B is an example of the standby screen before the live streaming with the digital camera 100 according to the present exemplary embodiment is started. As illustrated in FIG. 6B, the digital camera 100 displays a through-lens image on the display unit 106. At this time, the user can prepare for the live streaming by adjusting, for example, the angle of view while viewing the screen of the digital camera 100.

The digital camera 100 receives the information for executing the live streaming from the streaming server 300 via the relay server 200 through the above-described processing. The digital camera 100 performs the live streaming based on this information.

In S507, the user inputs an instruction to start transmitting the streaming data by operating the digital camera 100. For example, on the screen illustrated in FIG. 6B, the user selects a button 603 by performing a touch operation on the touch panel, thus inputting the instruction to start the live streaming process. The digital camera 100 transmits moving image data imaged and sound data collected in this operation and subsequent operations as the streaming data to the streaming server 300.

In S508, the digital camera 100 transmits the streaming data to the streaming server 300 in compliance with RTMP, not via the relay server 200 using the information received in S505. The streaming data transmitted at this time is live streamed via the streaming server 300. The digital camera 100 continuously transmits the streaming data and thus, the digital camera 100 can perform the live streaming via the streaming server 300. The digital camera 100 transmits not all the recorded streaming data but a part of the recorded streaming data. For example, if the streaming data is moving image data of five seconds, the digital camera 100 transmits moving image data of one second that is imaged first to the streaming server 300. Here, the streaming server 300 transmits (streams) the received streaming data to a user as a viewer. FIG. 6C illustrates an example of a screen during the live streaming of the digital camera 100 according to the present exemplary embodiment. As illustrated in FIG. 6C in this operation, the digital camera 100 displays "• Live" at the top left of the display unit 106, thus indicating to the user that the live streaming is being performed.

In S509, the digital camera 100 requests information regarding the state of the live streaming from the relay server 200. The information regarding the state of the live streaming is, for example, a numerical value indicating the number of users viewing the moving image that is imaged by the digital camera 100 and is being streamed by the streaming server 300 (hereinafter referred to as "the number of viewers"). The digital camera 100 displays the number of viewers, and thus, it is easy for the user performing the live streaming to grasp the number of viewers during the live streaming. Additionally, the information regarding the state of the live streaming includes, for example, the state of the speed of communication with the streaming server 300, a numerical value regarding the evaluation of the live streaming, and a comment transmitted from a viewer to the streaming server 300 during the live streaming. The digital camera 100 can also display these pieces of data on the display unit 106. In this operation, the digital camera 100 also transmits the identifier of the digital camera 100 to the relay server 200.

In S510, the relay server 200 requests the information regarding the state of the live streaming from the streaming server 300 using the authentication information recorded in association with the identifier of the digital camera 100. For example, the relay server 200 requests the information from the streaming server 300 using the access token.

In S511, the streaming server 300 transmits the information regarding the state of the live streaming to the relay server 200.

In S512, the relay server 200 transmits the information regarding the state of the live streaming to the digital camera 100. At this time, the digital camera 100 may reflect the information received in this operation on the display unit 106 in real time. For example, the digital camera 100 displays the number of viewers as a display item 604 based on the information regarding the state of the live streaming, and thus the digital camera can indicate the number of users currently viewing the live streaming, as illustrated in FIG. 6C.

Also during S509 to S512, the digital camera 100 repeats the process of S508 and continues transmitting the streaming data to the streaming server 300 in parallel.

In S513, the user inputs an instruction to end the live streaming by operating the digital camera 100. For example, on the screen illustrated in FIG. 6C the user selects a button 605 by performing a touch operation on the touch panel, thus inputting the instruction to end the live streaming.

In S514, the digital camera 100 ends the recording and the transmission of the moving image data.

In S515 the digital camera 100 transmits a notification for ending the live streaming to the relay server 200.

In S516, the relay server 200 requests the streaming server 300 to end the live streaming based on the notification received in S515.

In S517, as a response to the request, the streaming server 300 transmits to the relay server 200 a notification indicating that the live streaming is ended.

In S518, the relay server 200 transmits to the digital camera 100 a notification indicating that the live streaming is ended based on the notification received in S517.

As described above, in communication that requires less delay as in that for moving image data for use in live streaming, the digital camera 100 directly transmits the data to the streaming server 300. Further, the digital camera 100 uses a communication protocol with less delay in live streaming, such as RTMP.

This is the description of the live streaming process according to the first exemplary embodiment.

<Operation of Digital Camera 100>

Figure 6D:
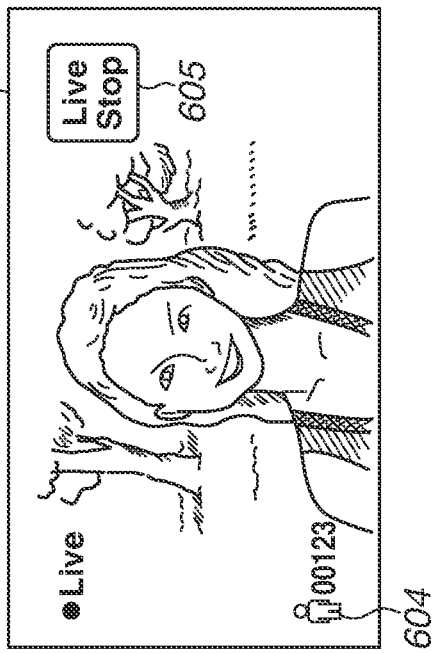
FIG. 6D illustrates an example of a screen for informing a user of a warning in the digital camera according to the first exemplary embodiment.
Figure 7:
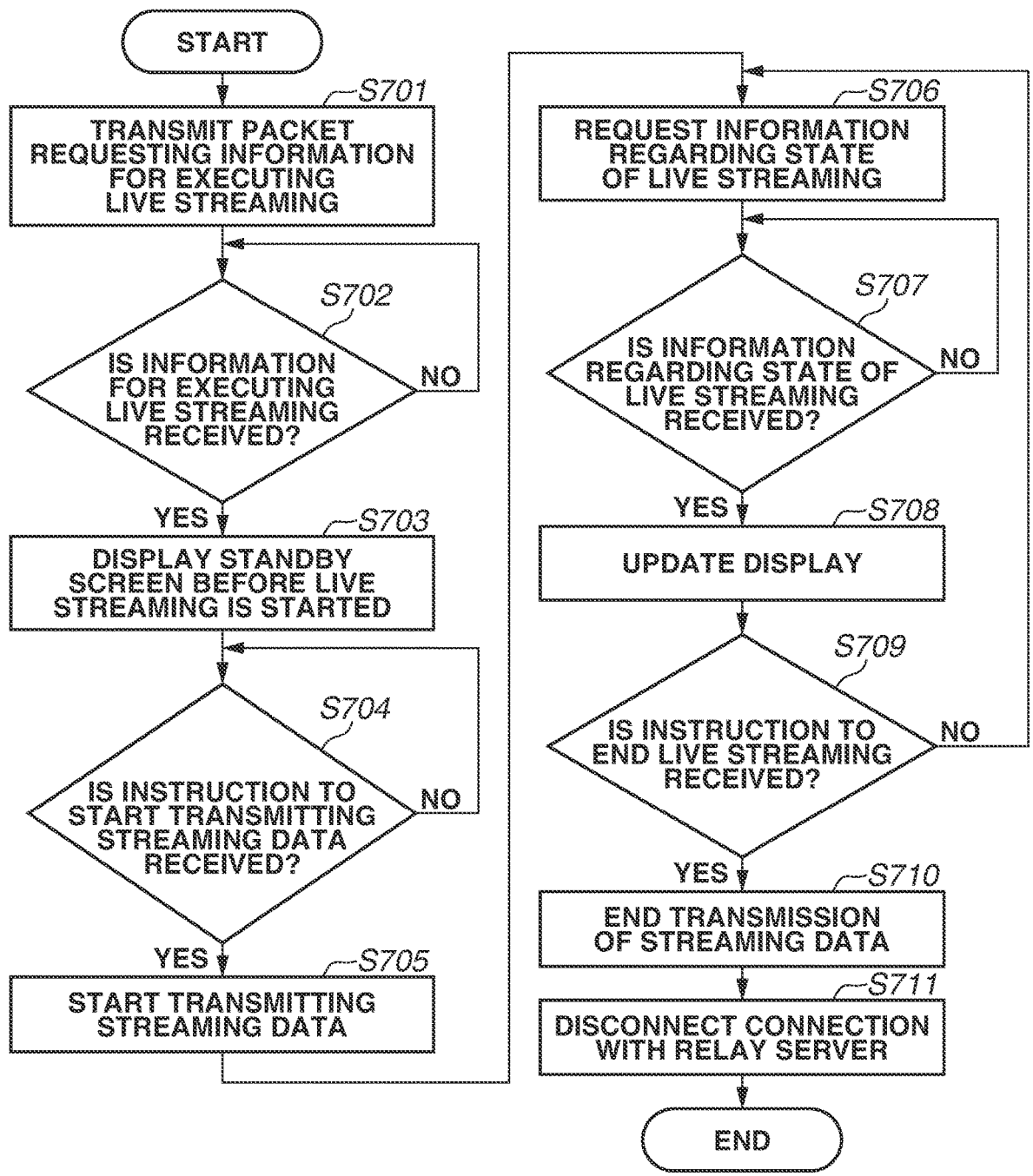
FIG. 7 is a flowchart illustrating an example of an operation of the digital camera according to the first exemplary embodiment.

FIGS. 6A, 6B, 6C, and 6D illustrate examples of display screens of the digital camera 100 according to the present exemplary embodiment. FIG. 7 is a flowchart illustrating an example of the operation of the digital camera 100 according to the present exemplary embodiment. With reference to FIGS. 6A, 6B, 6C, 6D, and 7, the processing of the digital camera 100 will be described. This processing is implemented by the control unit 101 loading software recorded in the non-volatile memory 103 into the work memory 104 and executing the software. The control unit 101 receiving an instruction to start the live streaming given by the user triggers the start of processing. For example, the user selects the button 602, on the screen illustrated in FIG. 6A, by performing a touch operation on the touch panel as a trigger, and the control unit 101 starts the processing of this flowchart. This corresponds to S501 in FIG. 5. If the user selects the button 602 without performing the preparation process for executing the live streaming, the control unit 101 displays a screen for informing the user of a warning as illustrated in FIG. 6D, thus prompting the user to execute the preparation process for executing the live streaming.

In S701, the control unit 101 transmits a packet requesting information for executing the live streaming to the relay server 200 via the connection unit 111. In this operation, the control unit 101 also transmits the identifier of the digital camera 100 to the relay server 200. This operation corresponds to S502 in FIG. 5.

In S702, the control unit 101 determines whether the information for executing the live streaming is received from the relay server 200 via the connection unit 111. If the information for executing the live streaming is received (Yes in S702), the control unit 101 holds the information in the work memory 104, and the processing proceeds to S703. The control unit 101 repeats this process until the information for executing the live streaming is received. The information for executing the live streaming is, for example, the destination URL for the live streaming and a stream key of the streaming server 300. This operation corresponds to S505 in FIG. 5.

In S703, the control unit 101 displays a screen as illustrated in FIG. 6B on the display unit 106. FIG. 6B illustrates an example of a standby screen before the live streaming of the digital camera 100 according to the present exemplary embodiment is started. The button 603 in FIG. 6B is an item for receiving the start of the live streaming. This operation corresponds to S506 in FIG. 5.

In S704, the control unit 101 determines whether an instruction to start transmitting streaming data is received. For example, if the control unit 101 detects that the button 603 is selected by the user performing a touch operation on the touch panel (Yes in S704), the processing proceeds to S705. The control unit 101 repeats this process until the instruction to start transmitting the streaming data is received from the user. This operation corresponds to S507 in FIG. 5. At this time, the control unit 101 sets, as the streaming data, moving image data imaged by the image capturing unit 102 in S705 and subsequent operations and sound data collected by the microphone 107 in S705 and subsequent operations.

In S705, the control unit 101 starts transmitting the streaming data to the streaming server 300 via the connection unit 111 in compliance with RTMP, not via the relay server 200. The control unit 101 continues transmitting the streaming data until the control unit 101 receives an instruction to end the live streaming from the user. If the control unit 101 holds the streaming data in the work memory 104, and the amount of the streaming data stored in the work memory 104 is greater than or equal to a predetermined amount, the control unit 101 transmits the streaming data to the streaming server 300 via the connection unit 111. The control unit 101 connects to the URL for the live streaming of the streaming server 300 and starts transmitting the stream key and the streaming data. At this time, as illustrated in FIG. 6C, the control unit 101 displays "• Live" at the top left of the display unit 106, thus indicating to the user that the live streaming is being performed. This operation corresponds to S508 in FIG. 5.

In S706, the control unit 101 transmits a packet requesting information regarding the state of the live streaming to the relay server 200 via the connection unit 111. The information regarding the state of the live streaming is, for example, the number of viewers. As illustrated in FIG. 6C, the display item 604 is a numerical value indicating the number of viewers accessing the streaming server 300 during the live streaming. This operation corresponds to S509 in FIG. 5.

In S707, the control unit 101 determines whether the information regarding the state of the live streaming is received from the relay server 200 via the connection unit 111. If the information regarding the state of the live streaming is received (Yes in S707), the processing proceeds to S708. The control unit 101 repeats this process until the information regarding the state of the live streaming is received. This operation corresponds to S512 in FIG. 5.

In S708, the control unit 101 updates the display of the display unit 106. For example, the control unit 101 updates the display of the number of viewers indicated by the display item 604 in FIG. 6C.

In S709, the control unit 101 determines whether an instruction to end the live streaming is received from the user. If the instruction to end the live streaming is received (Yes in S709), the processing proceeds to S710. If the instruction to end the live streaming is not received (No in S709), the processing returns to S706. In S706, the control unit 101 continues the live streaming. For example, the control unit 101 receives the instruction to end the live streaming by detecting that the user selects the button 605 illustrated in FIG. 6C with a touch operation on the touch panel. Until the instruction to end the live streaming is given by the user, the control unit 101 repeats the processes of S706 to S709 and continues acquiring and displaying the information regarding the state of the live streaming. This operation corresponds to S513 in FIG. 5. The control unit 101 continues the transmission of the streaming data started in S705 even while repeating the processes of S706 to S709.

In S710, the control unit 101 ends the transmission of the streaming data to the streaming server 300. This operation corresponds to S514 in FIG. 5.

In S711, the control unit 101 disconnects the connection with the relay server 200 and the streaming server 300, and the processing ends. This operation corresponds to S515 and S518 in FIG. 5.

The foregoing is the description of the operation of the digital camera 100.

<Operation of Relay Server 200>

Figure 8:
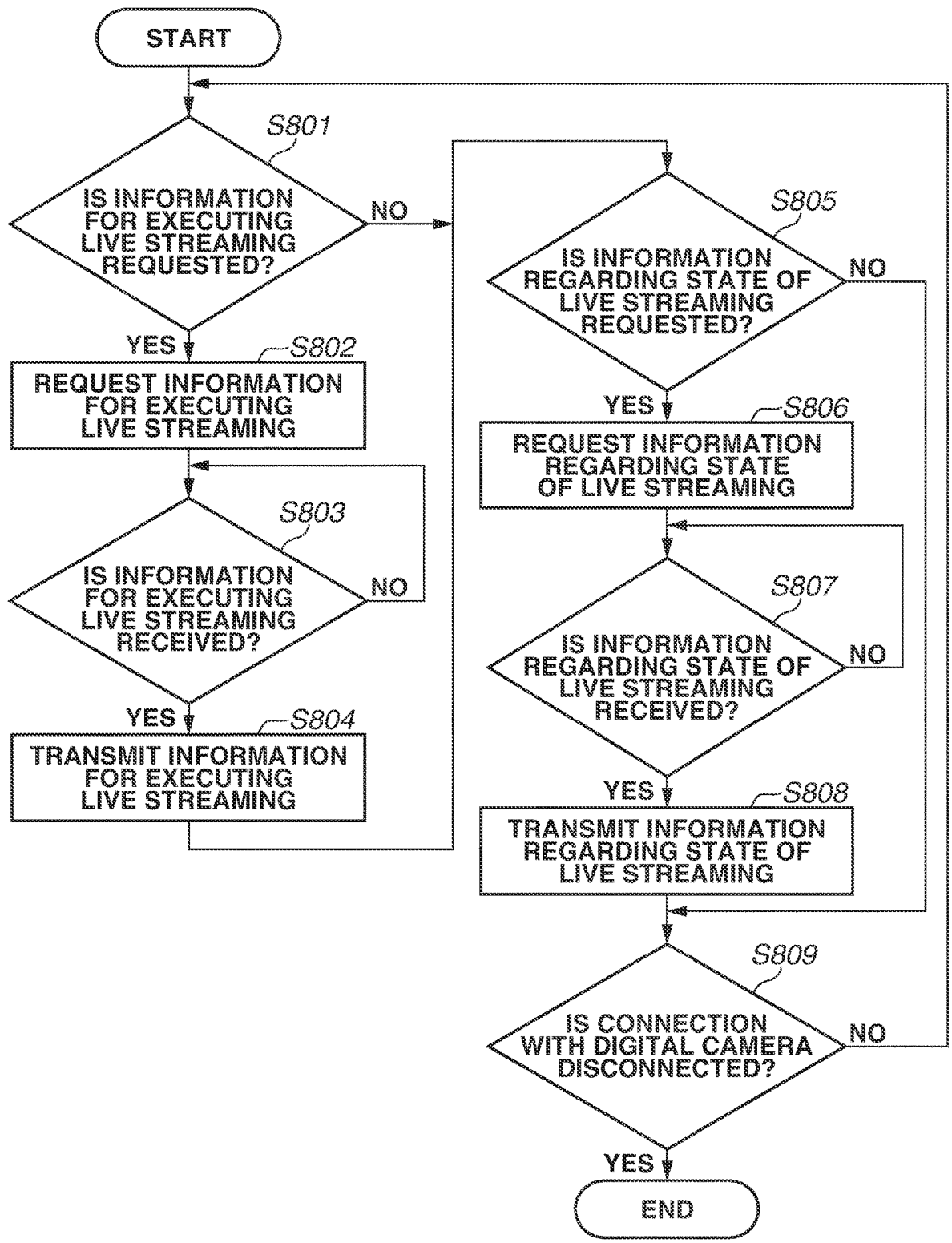
FIG. 8 is a flowchart illustrating an example of an operation of the relay server according to the first exemplary embodiment.

With reference to FIG. 8, the operation of the relay server 200 according to the present exemplary embodiment will be described below. When the relay server 200 and the digital camera 100 connect to each other, this processing is started.

In S801, the control unit 201 determines whether a packet requesting information for executing the live streaming is received. If this request packet is received (Yes in S801), the processing proceeds to S802. The control unit 201 repeats the process of this operation until the request packet is received. At this time, the control unit 201 receives the identifier of the digital camera 100 via the connection unit 204. This operation corresponds to S502 in FIG. 5.

In S802, the control unit 201 compares the identifier received in S801 with the identifier of the digital camera 100 recorded in S405 in FIG. 4. If the two identifiers match each other, the control unit 201 holds in the work memory 203 the authentication information associated with the identifier of the digital camera 100 recorded in S405 in FIG. 4. The control unit 201 then transmits a packet requesting the information for executing the live streaming to the streaming server 300 via the connection unit 204, using the authentication information. This operation corresponds to S503 in FIG. 5.

In S803, the control unit 201 determines whether the information for executing the live streaming is received from the streaming server 300 via the connection unit 204. If the information for executing the live streaming is received (Yes in S803), the processing proceeds to S804. The control unit 201 repeats the process of this operation until the information for executing the live streaming is received. The information for executing the live streaming is, for example, the URL for the live streaming and a stream key. This operation corresponds to S504 in FIG. 5.

In S804, the control unit 201 transmits the information for executing the live streaming to the digital camera 100 via the connection unit 204. This operation corresponds to S505 in FIG. 5.

In S805, the control unit 201 determines whether a packet requesting information regarding the state of the live streaming is received via the connection unit 204. If the packet requesting the information regarding the state of the live streaming is received (Yes in S805), the processing proceeds to S806. The control unit 201 repeats the process of this operation until the packet requesting the information regarding the state of the live streaming is received. At this time, the control unit 201 receives the identifier of the digital camera 100 from the digital camera 100. This operation corresponds to S509 in FIG. 5.

In S806, the control unit 201 transmits a packet requesting the information regarding the state of the live streaming to the streaming server 300 via the connection unit 204. This operation corresponds to S510 in FIG. 5.

In S807, the control unit 201 determines whether the information regarding the state of the live streaming is received via the connection unit 204. If the information regarding the state of the live streaming is received (Yes in S807), the processing proceeds to S808. The control unit 201 repeats the process of this operation until the information regarding the state of the live streaming is received. This operation corresponds to S511 in FIG. 5.

In S808, the control unit 201 transmits the information regarding the state of the live streaming to the digital camera 100 via the connection unit 204. This operation corresponds to S512 in FIG. 5.

In S809, the control unit 201 determines whether the connection with the digital camera 100 is disconnected. If it is detected that the connection with the digital camera 100 is disconnected (Yes in S809), the control unit 201 disconnects the connection with the streaming server 300, and this processing ends. If the connection with the digital camera 100 is not disconnected (No in S809), the processing returns to S801. In S801, the control unit 201 continues this processing. This operation corresponds to S516 and S517 in FIG. 5.

The foregoing is the description of the operation of the relay server 200.

As described above, the present exemplary embodiment enables the digital camera 100 to receive information for executing live streaming and information regarding the state of the live streaming from the streaming server 300, not depending on a web API of the streaming server 300.

Further, the digital camera 100 can transmit streaming data to the streaming server 300 with less delay.

A second exemplary embodiment will be described below. In the first exemplary embodiment, the digital camera 100 performs live streaming based on information for executing the live streaming received from the streaming server 300. In the present exemplary embodiment, a description will be provided of an example of a system in which a user freely selects an event and performs live streaming.

The configurations of a digital camera 100, a relay server 200, and a streaming server 300 are similar to those in the first exemplary embodiment, and thus the descriptions thereof are omitted here. A communication system is also similar to that according to the first exemplary embodiment, and thus the description thereof is omitted here.

<Preparation Process for Executing Live Streaming>

Figure 10A:
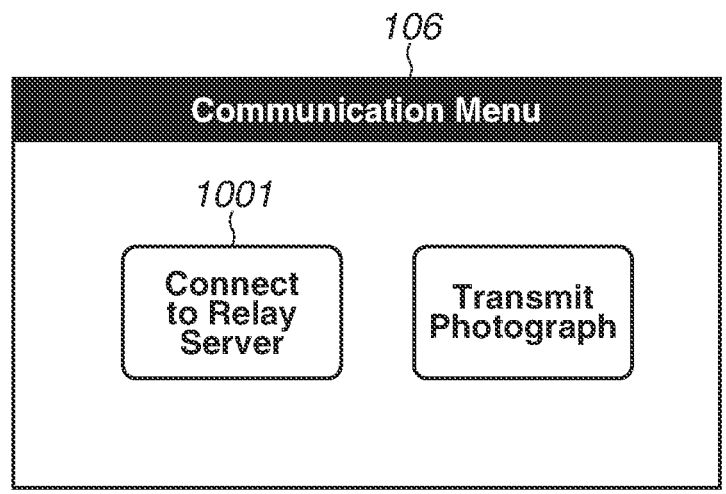
FIG. 10A illustrates an example of menu display of functions regarding communication of a digital camera in which a function of executing live streaming is not enabled according to the second exemplary embodiment.
Figure 10B:
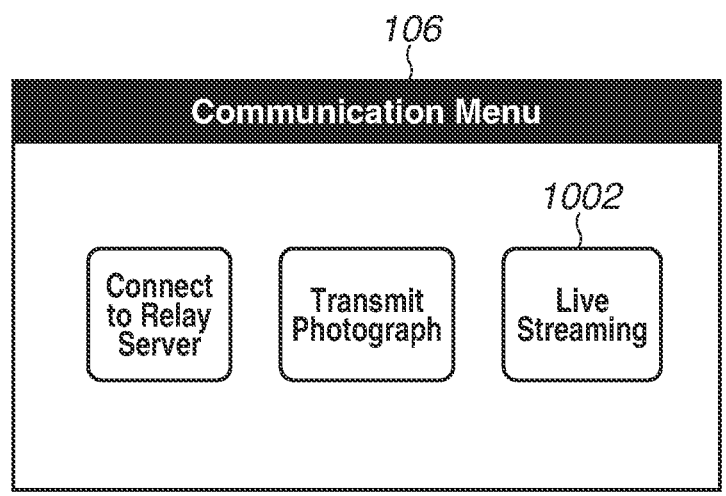
FIG. 10B illustrates an example of the menu display of the functions regarding communication of the digital camera in which the function of executing live streaming is enabled according to the second exemplary embodiment.

With reference to FIGS. 9, 10A, and 10B, a description will be provided of a preparation process in a case where the relay server 200 enables the function of executing live streaming in the digital camera 100. FIG. 9 is a sequence diagram illustrating an example of a preparation process for executing live streaming according to the second exemplary embodiment. In this case, the digital camera 100 and the relay server 200 already cooperate with each other.

In S901, the digital camera 100 and the relay server 200 establish a connection. In this operation, the relay server 200 generates the identifier of the digital camera 100. The identifier is, for example, an ID including eight-digit alphanumeric characters. FIG. 10A illustrates an example of menu display of functions regarding communication of the digital camera 100 in which the function of executing live streaming in the digital camera 100 is not enabled. For example, the digital camera 100 connects to the relay server 200 by the user selecting a button 1001 with a touch operation on the touch panel on the menu display.

In S902, the user instructs the relay server 200 to enable the function of executing live streaming in the digital camera 100. In this operation, the user inputs registration information to the relay server 200.

In S903, the relay server 200 requests authentication information from the streaming server 300. At this time, the relay server 200 uses the registration information input in S902. The authentication information is, for example, an access token.

In S904, the relay server 200 receives the authentication information from the streaming server 300. The relay server 200 can access the streaming server 300 using the authentication information.

In S905, the relay server 200 records the identifier of the digital camera 100 generated in S901 and the authentication information received in S904 in association with each other.

In S906 the relay server 200 requests the digital camera 100 to enable the function of executing live streaming. At this time, the relay server 200 may transmit data required to enable the function of executing live streaming. For example, the relay server 200 may transmit an icon for the digital camera 100 to display the function of executing live streaming.

In S907, the digital camera 100 enables the function of executing live streaming. FIG. 10B illustrates an example of the menu display of the functions regarding communication of the digital camera 100 with the function of executing live streaming being enabled. The function of executing live streaming is enabled, and thus the digital camera 100 displays a button 1002 in the communication menu, indicating to the user that live streaming can be performed.

<Live Streaming Process>

Figure 11:
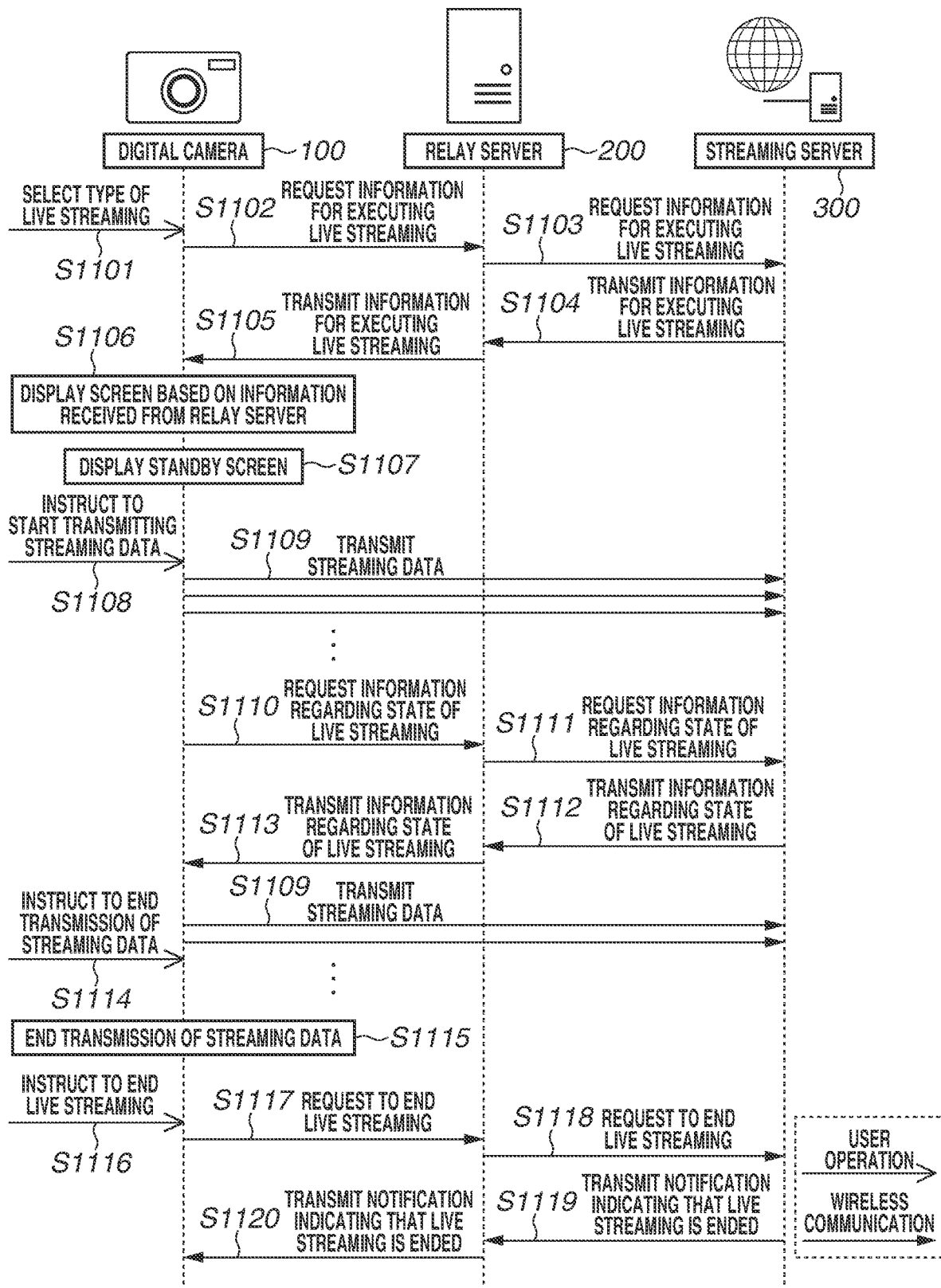
FIG. 11 is a sequence diagram illustrating an example of processing of the digital camera, a relay server, and a streaming server when the live streaming according to the second exemplary embodiment is executed.

FIG. 11 is a diagram illustrating the sequence of an example of the processing of the digital camera 100, the relay server 200, and the streaming server 300 when the live streaming according to the present exemplary embodiment is executed. FIGS. 12A, 12B, 12C, and 12D illustrate examples of display screens of the digital camera 100 according to the present exemplary embodiment. With reference to FIGS. 11, 12A, 12B, 12C, and 12D, a series of operations in the live streaming will be described.

In S1101 the user selects the type of the live streaming. FIG. 12A illustrates an example of a screen for selecting the type of live streaming with the digital camera 100. A display item 1201 is an item for selecting a live streaming method "immediately stream". In this live streaming, the digital camera 100 performs the live streaming based on default settings recorded in the streaming server 300. A display item 1202 is an item for selecting the execution of the live streaming based on an event recorded in the streaming server 300. In this live streaming, the digital camera 100 performs the live streaming based on event settings recorded in the streaming server 300. For example, the user starts the live streaming process by performing a touch operation on the touch panel.

In S1102, the digital camera 100 requests information for executing the live streaming from the relay server 200. Here, the information for executing the live streaming is, for example, the destination URL for the live streaming and a stream key. At this time, the digital camera 100 notifies the relay server 200 of the live streaming based on "immediately stream" or the live streaming based on "event". The digital camera 100 communicates with the relay server 200 using a web API defined by the relay server 200.

In S1103 the relay server 200 requests the information for executing the live streaming of the digital camera 100 from the streaming server 300. At this time, the relay server 200 notifies the streaming server 300 of the live streaming based on "immediately stream" or the live streaming based on "event". The relay server 200 communicates with the streaming server 300 using a web API defined by the streaming server 300.

In S1104, as a response to the request, the streaming server 300 transmits the information for executing the live streaming to the relay server 200. The information to be transmitted by the streaming server 300 differs depending whether the live streaming is based on "immediately stream" or based on "event". In the case of the live streaming based on "immediately stream", the streaming server 300 transmits a default event recorded by the user of the digital camera 100 to the relay server 200. In the case of the live streaming based on "event", the streaming server 300 transmits all events recorded by the user of the digital camera 100.

In S1105, the relay server 200 transmits the information received in S1104 to the digital camera 100.

In S1106, the digital camera 100 displays a screen based on the information received from the relay server 200 in S1105. In the case of the live streaming based on "immediately stream", the digital camera 100 displays, for example, a confirmation screen as illustrated in FIG. 12B. In the live streaming based on "immediately stream", the digital camera 100 displays as a display item 1203 a title name set as default by the user as illustrated in FIG. 12B. For example, the user selects "OK" by performing a touch operation on the touch panel, and thus, the digital camera 100 displays a standby screen for the live streaming.

In the case of the live streaming based on "event", the digital camera 100 displays, for example, a selection screen as illustrated in FIG. 12C. As illustrated in FIG. 12C, first, the digital camera 100 displays a list of events received from the relay server 200. For example, as illustrated in display items 1204 and 1205 in FIG. 12C, the title names of events are displayed in the list of events. In this way, the digital camera 100 displays events transmitted from the relay server 200 so that the user can select the events. If the user selects the event of the display item 1204 by performing a touch operation on the touch panel, the digital camera 100 displays a confirmation screen as illustrated in FIG. 12D. In the live streaming based on "event", the digital camera 100 displays as the display item 1203 the title name of the event selected by the user, as illustrated in FIG. 12D. For example, the digital camera 100 displays the start time of the live streaming as a display item 1206. In this way, the digital camera 100 may change display items of information included in an event based on the method for the live streaming.

S1107 to S1115 are similar to S506 to S514, respectively, in FIG. 5, and thus a description thereof is omitted.

In S1116, the digital camera 100 returns to the state before the streaming data is transmitted as illustrated in FIG. 6B. At this time, even if the transmission of the streaming data is ended, the digital camera 100 does not request the relay server 200 to end the live streaming, and waits in the state where the transmission of the streaming data is ended in the present exemplary embodiment, which is different from the first exemplary embodiment. Here, the user selects the button 603 in FIG. 6B, for example, and thereby can resume the live streaming. This configuration enables the user to immediately resume the live streaming even if the user erroneously ends the live streaming. This configuration also enables the user to temporarily suspend the live streaming and resume the live streaming at any timing.

S1117 to S1120 are similar to S515 to S518, respectively, in FIG. 5, and thus, a description thereof is omitted.

This is the description of the live streaming process according to the second exemplary embodiment.

According to the present exemplary embodiment, in addition to the advantageous effects of the first exemplary embodiment, the user can perform live streaming based on any settings using the digital camera 100.

Other Exemplary Embodiments

Some embodiments can also be realized by the process of supplying a program for realizing one or more functions of the above exemplary embodiments to a system or an apparatus via a network or a storage medium, and causing one or more processors of a computer of the system or the apparatus to read and execute the program. Some embodiments can also be realized by a circuit (e.g., an application-specific integrated circuit (ASIC)) for realizing the one or more functions.

And some embodiments are not limited to the above exemplary embodiments as they are, and can be embodied by modifying some of the components of the exemplary embodiments. Various embodiments can be formed by appropriately combining a plurality of components discussed in the exemplary embodiments described above. For example, some of the components illustrated in the exemplary embodiments may be deleted. Further, components in different exemplary embodiments may be appropriately combined together.

According to the disclosure, it is possible to both reduce the delay of communication between a communication apparatus and a cloud service and save a user the trouble of updating the communication apparatus.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-242855, which was filed on Dec. 26, 2018 and which is hereby incorporated by reference herein in its entirety.

What is claimed is:

1. A communication apparatus comprising:
a communication unit;
one or more memories storing instructions; and
one or more processors in communication with the one or more memories, wherein the one or more memories and the one or more processors cooperate to implement a control unit,
wherein, in a case where the control unit performs control to cause a relay apparatus to send a request for second data for transmitting first data to an external apparatus, the control unit performs control to cause the communication unit to transmit, to the relay apparatus, an identifier of the communication apparatus which is associated with authentication information, the authentication information being used by the relay apparatus for receiving the second data generated by the external apparatus;
wherein the control unit performs control to cause the communication unit to receive the second data from the relay apparatus,
wherein the control unit performs control to cause the communication unit to transmit the first data to the external apparatus without going through the relay apparatus based on the second data,
wherein the first data is communicated in compliance with a first communication protocol, and the second data is communicated in compliance with a second communication protocol, and
wherein a communication compliant with the first communication protocol is less delayed than a communication compliant with the second communication protocol.

2. The communication apparatus according to claim 1, wherein the control unit performs control to cause the communication unit to transmit, to the relay apparatus, registration information for the relay apparatus to receive the second data from the external apparatus.

3. The communication apparatus according to claim 2, wherein the registration information includes an account identification (ID) and a password to be used to access the external apparatus.

4. The communication apparatus according to claim 1, wherein, in a case where an instruction to transmit the first data to the external apparatus is received before the second data is received, the control unit informs a user of a warning.

5. The communication apparatus according to claim 4, wherein the warning indicates that the second data is not received.

6. The communication apparatus according to claim 1, further comprising one or both of an image capturing unit and a sound collection unit that are configured to generate the first data,
wherein the image capturing unit or the sound collection unit continues generating the first data even after the communication unit starts transmitting the first data to the external apparatus, and
wherein the control unit performs control to cause the communication unit to transmit, to the external apparatus, at least a part of data that is included in the first data having been generated by the image capturing unit or the sound collection unit and has not been transmitted to the external apparatus, even while the image capturing unit or the sound collection unit is generating the first data.

7. The communication apparatus according to claim 6, wherein, in a case where the control unit receives an instruction to start transmitting the first data, the control unit performs control to cause the image capturing unit or the sound collection unit to start generating the first data and cause the communication unit to start transmitting the first data.

8. The communication apparatus according to claim 6, wherein, in a case where the control unit receives an instruction to end the transmission of the first data, the control unit performs control to cause the image capturing unit or the sound collection unit to end the generation of the first data and cause the communication unit to end the transmission of the first data.

9. The communication apparatus according to claim 6, further comprising both the image capturing unit and the sound collection unit.

10. The communication apparatus according to claim 6, wherein, upon receiving an instruction to end the transmission of the first data, the control unit performs control to cause the communication unit to transmit, to the relay apparatus, a notification about ending the transmission of the first data to the external apparatus.

11. The communication apparatus according to claim 6, wherein, in a case where an instruction to start transmission of the first data is received before transmitting a notification about ending the transmission of the first data to the external apparatus after receiving an instruction to end the transmission of the first data, the control unit performs control to cause the communication unit to resume the transmission of the first data.

12. The communication apparatus according to claim 1, wherein the control unit performs control to cause the communication unit to receive information regarding the first data in a service provided by the external apparatus via the relay apparatus in parallel with the transmission of the first data.

13. The communication apparatus according to claim 12, wherein the service includes a live streaming service.

14. The communication apparatus according to claim 12, wherein the information regarding the first data in the service includes the number of users receiving the first data using the service.

15. The communication apparatus according to claim 1, wherein the first data includes at least one of moving image data and sound data.

16. The communication apparatus according to claim 1, wherein the second data includes a Uniform Resource Locator (URL) that is a transmission destination of the first data, and a stream key.

17. The communication apparatus according to claim 1, wherein the first communication protocol includes Real-Time Messaging Protocol, and the second communication protocol includes Hypertext Transfer Protocol.

18. A control method for controlling a communication apparatus including a communication unit capable of communicating over a second communication protocol and a first communication protocol, the first communication protocol over which a communication is less delayed than a communication over the second communication protocol, the control method comprising:
  in a case where a relay apparatus sends a request for second data for transmitting first data to an external apparatus, performing control to cause the communication unit to transmit, to the relay apparatus, an identifier of the communication apparatus which is associated with authentication information, the authentication information being used by the relay apparatus for receiving the second data generated by the external apparatus;
  performing control to cause the communication unit to receive, from the relay apparatus, the second data for transmitting the first data to the external apparatus;
  performing control to cause the communication unit to transmit the first data to the external apparatus without going through the relay apparatus based on the second data; and
  communicating the first data in compliance with the first communication protocol and communicating the second data in compliance with the second communication protocol.

19. A non-transitory recording medium that records a program for causing a communication apparatus comprising a communication unit capable of communicating over a second communication protocol and a first communication protocol, the first communication protocol over which a communication is less delayed than a communication over the second communication protocol, to execute a control method comprising:
  in a case where a relay apparatus sends a request for second data for transmitting first data to an external apparatus, performing control to cause the communication unit to transmit, to the relay apparatus, an identifier of the communication apparatus which is associated with authentication information, the authentication information being used by the relay apparatus for receiving the second data generated by the external apparatus;
  performing control to cause the communication unit to receive, from the relay apparatus, the second data for transmitting the first data to the external apparatus;
  performing control to cause the communication unit to transmit the first data to the external apparatus without going through the relay apparatus based on the second data; and
  communicating the first data in compliance with the first communication protocol and communicating the second data in compliance with the second communication protocol.

20. A relay apparatus comprising:
  a communication unit;
  one or more memories storing instructions; and
  one or more processors in communication with the one or more memories, wherein the one or more memories and the one or more processors cooperate to implement a control unit,
  wherein, in a case where the control unit performs control to receive, from a communication apparatus, a request for second data for transmitting first data to an external apparatus, the control unit performs control to receive, from the communication apparatus, an identifier of the communication apparatus which is associated with authentication information, the authentication information being used by the relay apparatus for receiving the second data generated by the external apparatus, and
  wherein, in a case where the control unit performs control to receive the second data from the external apparatus, the control unit performs control to transmit the received second data to the communication apparatus.

21. The relay apparatus according to claim 20, wherein in a case where the communication apparatus transmits the first data to the external apparatus, the control unit performs control to transmit information about the transmitted first data to the communication apparatus.

22. The relay apparatus according to claim 20, wherein in a case where the communication apparatus ends transmission of the first data to the external apparatus, the control unit performs control to transmit a request for the communication apparatus to end the transmission of the first data to the external apparatus.

23. A control method for controlling a relay apparatus including a communication unit, the control method comprising:
  in a case where control is performed to receive, from a communication apparatus, a request for second data for transmitting first data to an external apparatus, performing control to receive, from the communication apparatus, an identifier of the communication apparatus which is associated with authentication information, the authentication information being used by the relay apparatus for receiving the second data generated by the external apparatus; and
  in a case where control is performed to receive the second data from the external apparatus, performing control to transmit the received second data to the communication apparatus.

24. A non-transitory recording medium that records a program for causing a relay apparatus comprising a communication unit, to execute a control method comprising:

in a case where control is performed to receive, from a communication apparatus, a request for second data for transmitting first data to an external apparatus, performing control to receive, from the communication apparatus, an identifier of the communication apparatus which is associated with authentication information, the authentication information being used by the relay apparatus for receiving the second data generated by the external apparatus; and in a case where control is performed to receive the second data from the external apparatus, performing control to transmit the received second data to the communication apparatus.

\* \* \* \* \*